(12) United States Patent
Bao et al.

(10) Patent No.: US 11,384,012 B2
(45) Date of Patent: Jul. 12, 2022

(54) ATOMIZED ANTI-SCRATCHING NANO-COATING FOR GLASS SURFACE AND METHOD OF MANUFACTURING THEREOF

(71) Applicant: Nano and Advanced Materials Institute Limited, Hong Kong (HK)

(72) Inventors: Su Ping Bao, Hong Kong (HK); Wenjun Luo, Hong Kong (HK); Lei Gao, Hong Kong (HK); Man Lung Sham, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 0 days.

(21) Appl. No.: 17/035,737

(22) Filed: Sep. 29, 2020

(65) Prior Publication Data

US 2021/0101828 A1    Apr. 8, 2021

Related U.S. Application Data (60) Provisional application No. 62/910,403, filed on Oct. 3, 2019.

(51) Int. Cl.
| | |
|---|---|
| *C03C 17/25* | (2006.01) |
| *C09D 1/00* | (2006.01) |
| *C09D 5/02* | (2006.01) |
| *C01B 33/12* | (2006.01) |

(52) U.S. Cl.
CPC ............ *C03C 17/25* (2013.01); *C01B 33/126* (2013.01); *C09D 1/00* (2013.01); *C09D 5/02* (2013.01); *C03C 2217/213* (2013.01); *C03C 2217/76* (2013.01); *C03C 2217/78* (2013.01); *C03C 2218/113* (2013.01)

(58) Field of Classification Search
CPC ...... C03C 17/25; C03C 2217/213; C09D 1/00
See application file for complete search history.

(56) References Cited

FOREIGN PATENT DOCUMENTS

| | | |
|---|---|---|
| CN | 102161864 A | 8/2011 |
| CN | 102553813 A | 7/2012 |
| CN | 103965673 A | 8/2014 |
| CN | 107629492 A | 1/2018 |
| CN | 109867990 * | 6/2019 |
| CN | 109867990 A | 6/2019 |
| JP | H06228755 A | 8/1994 |

OTHER PUBLICATIONS

CN 109 867 990 machine translation (2019).*
First Office Action of corresponding CN Invention Patent Application No. 202011066191.3 dated Oct. 9, 2021.

* cited by examiner

*Primary Examiner* — Kuo Liang Peng
(74) *Attorney, Agent, or Firm* — Idea Intellectual Limited; Margaret A. Burke; Sam T. Yip (57) ABSTRACT

A durable, hydrophobic and anti-scratching nano-coating for coating on a glass substrate or surface having a water contact angle of about 90° or more, a reduced coefficient of friction by 50% or more, and a reduced surface roughness compared to those of the glass substrate or surface without the nano-coating is provided, which includes a layer of fluorinated silica derived from sol-gel hydrolysis between one or more tetraalkoxysilanes having at least three alkoxy groups and one or more polyfluorinated silanes having at least a trialkoxysilane and from 15 to 17 fluorine atoms in the presence of a catalyst to a reaction mixture of the sol-gel hydrolysis between the one or more tetraalkoxysilanes and the one or more polyfluorinated silanes, and a solvent. A related method of fabricating the nano-coating via atomization of acid-containing or alkali-containing solution and sol-gel precursor solution onto the glass surface is also provided.

22 Claims, 8 Drawing Sheets

FIG. 6A

ATOMIZED ANTI-SCRATCHING NANO-COATING FOR GLASS SURFACE AND METHOD OF MANUFACTURING THEREOF

CROSS-REFERENCE TO RELATED APPLICATIONS

This application claims priority from the U.S. provisional patent application Ser. No. 62/910,403 filed Oct. 3, 2019, and the disclosure of which is incorporated herein by reference in its entirety.

FIELD OF THE INVENTION

This invention relates to an atomized anti-scratching nano-coating for glass substrate/surface and a method of manufacturing the same. In particular, the present nano-coating is synthesized from liquid sol-gel precursors and in a manner which the liquid sol-gel precursors are applied to form an anti-scratching nanolayer on a glass substrate/surface with atomization process. Such atomization process can be used to fabricate functional nano-coatings for a variety of applications on glass/mirror surfaces including glass/mirror surface protection, hydrophobic and/or hydrophilic nano-coatings for glass/mirror and others.

BACKGROUND

Glass is susceptible to be scratched by various foreign abrasive substances during its service life and scratches on glass are therefore often a vexing problem. Some prevention practices, such as the additional hard nano-coatings, are used to reduce the scratching on the glass significantly with the remain of original appearance of glass.

U.S. Pat. Application Pub. No. 2017/0253523 A1 relates to methods for forming tribological thin films and more specifically to a sol-gel method for forming durable, scratch-resistant coating on glass substrates. For example, zirconia coatings are formed from a solution of zirconium oxychloride octahydrate in an organic solvent.

U.S. Pat. No. 9663400 discloses the methods for forming tribological thin films and more specifically to form durable, scratch-resistant coatings in a sol-gel route. The method provides a first solution consisting of a zirconium compound in a first polar solvent and a second solution consisting of graphene nanoscale particles in a second polar solvent and/or depositing the combined solution onto the display glass substrate to form a coating followed by the annealing treatment. The coatings with the thickness of about 50 microns are prepared by spin-coating respective solutions onto glass substrates. The coefficient of friction of the graphene-doped zirconia-coated display glass is about 0.10-0.11 while the bare glass is about 0.3-0.4.

U.S. Pat. Application Pub. No. 2009/0053465 A1 relates to an optical element or component with multi-layered structure, which has an excellent anti-fogging effect and/or anti-misting effect and exhibits an excellent scratch resistance and/or reflection reducing effect and optionally even exhibited hydrophobic and/or oleophobic properties. In the invention, a synthetic resin lens is coated with a hardening silicone film and then coated with an anti-fogging film as the water absorbing layer and then an anti-reflection layer system is applied on water-absorbing layer in a vacuum process. The hard layer is formed from an inorganic material by means of plasma enhanced layer deposition techniques or chemical vapor deposition (CVD) or from traditional coating methods including dipping, spraying or spinning methods. The thickness of the hard layer is set to be less than 20 µm, especially preferred to be 1 to 5 µm. The hydrophobic and/or oleophobic coating comprises a silane having at least one fluorine-containing group and it is preferred to apply this coating by conventional methods including layer evaporation, CVD or by a dip method. And the thickness of the hydrophobic and/or oleophobic coating is preferably ≤20 nm.

U.S. Pat. Application Pub. No. 2017/0336536 A1 discloses a blue-ray resisting glass protection sheet of a display screen, which comprises: a glass substrate with one side surface of an atomization layer of fingerprint resisting coating and the other side of a blue-ray resisting coating and AB glue layer is bonding to a surface of the blue-ray resisting coating. The surface of the fingerprint resisting coating is super smooth with the coefficient of friction smaller than 0.02. The thickness range of the fingerprint resisting coating/film is 15-25 nm.

U.S. Pat. No. 10285292 B2 discloses a nano-crystalline layer formed as a series of layers separated by or interspersed with one or more other layers including a non-crystalline or amorphous material. The nano-crystalline layer can be formed by a deposition process or by an ion-implanting and annealing process to form crystals having a size of less than 10 nanometer to protect the electronic device from scratching and/or damage caused by impact.

U.S. Pat. Application Pub. No. 2012/0132053 A1 relates to glass sheet surface protection during glass finishing and packing by forming a discontinuous layer of a long-chain organic material having a main carbon chain comprising at least 12 carbon atoms and a hydrophilic group at one end of the main chain on the sheet surface. The organic material can be applied by various means including spray coating and dip coating. The material can also be applied by a carrier gas stream while the long-chain organic material may be present in solid, liquid or gas form in the carrier gas stream. The temperature of gas stream should be above the melting point of the long-chain organic material but should not higher than 60° C. to avoid the disintegration, oxidation, reaction, burning of explosion of the long-chain organic material. This kind of glass sheet surface protection is particularly useful during glass sheet finishing such as edge grinding and polishing.

U.S. Pat. Application Pub. No. 2014/0131091 A1 discloses a scratch-resistant glass substrate prepared by forming a phase-transformable scratch-resistant layer comprising the metastable, tetragonal polymorph of zirconium oxide. The phase-transformable layer with the thickness ranging from 10 nm to 2000 nm can minimize the formation of scratches and the visibility of scratches.

U.S. Pat. Application Pub. No. 2014/0093711 A1 discloses a scratch-resistant glass substrate prepared by forming a hard, scratch-resistant layer from an inorganic material such as a metal oxide, metal, nitride, metal carbide, or metal boride using physical vapor deposition at a process temperature of less than 500° C.

U.S. Pat. Application Pub. No. 6245387 B1 discloses a silicone film attached to a surface by chemical bonding. The silicone film consists of chains of siloxane groups, each chain terminating in an end molecule which is either an ester, an ether, or a halogen. The end molecule is allowed to react with water to produce an OH group. The surface is then contacted with a capping agent which reacts with the OH group to produce a new end group which improves the properties of the film. The silicone film provides water repellency property for the surface, especially for the glass surface.

U.S. Pat. Application Pub. No. 20170313819 A1 relates to fluorinated silane compounds and compositions that can be soluble or dispersible in aqueous media and can be used to coat articles, e.g. glass articles.

U.S. Pat. No. 5,587,209 discloses a fluorocarbon-based polymer lamination coating film having strong adhesion to a surface of the substrate. In the invention, a monomolecular or polymer absorbed film having —Si— bonds is formed from dehydrochlorination or dealchoholation bonded on the substrate surface, causing a silane-based surface active material capable of reaction with an active hydrogen. Then a fluorine-based polymer is bonded on the adsorbed film by a cross-linking reaction process. The material with a fluorine resin coating is applied in a variety of articles such as frying pans, stainless steel rolls, plates, etc.

U.S. Pat. No. 5,587,209 discloses a hydrophobic coating for a glass, ceramic or vitroceramic substrate and the coating comprises a primer layer and a coating layer and a process for obtaining such a coating. The primer layer comprising groups Si—R—Si can be directly applied onto the substrate and the coating layer in connection with the primer layer comprises an alkylsilane with a hydrophobic/olephobic perfluorinated end group.

U.S. Pat. Application Pub. No. 20150210587 A1 discloses a method of forming a coated glass substrate which involves: a) applying a first composition that includes a hydrolysable silane to a surface of a glass substrate to form a treated glass surface; b) applying to the treated surface a second composition that includes a fluorinated polyether modified silane to form an intermediated coated glass substrate and c) subjecting the intermediate coated glass substrate to elevated temperature, thereby curing the second composition and forming the coated glass substrate. The coated glass substrates can possess anti-fouling properties.

The common feature of most of the state-of-the-art methods for producing anti-scratching coating for glass is the application of multi-layer coatings from inorganic or organic materials via traditional coating processes such as spraying, dipping or deposition methods. However, the visible thickness of multi-layer coatings and the complicated processes limits the use of such materials. In the last decade, tremendous efforts have been devoted to promote the nano-coating technology and its applications and it has also attracted increasing attention in the field of building and construction materials. A durable, hydrophobic, and anti-scratching coating with a low coefficient of friction being applied on glass substrate/surface via atomization deposition is therefore of utmost importance.

SUMMARY OF THE INVENTION

Accordingly, a first aspect of the present invention related to a durable, hydrophobic, and anti-scratching nano-coating synthesized from a sol-gel precursor solution and being formed onto a glass substrate/surface which is pre-treated with a solution containing more than one acid via atomization process prior to atomization of the sol-gel precursors to form the nano-coating onto the glass substrate/surface.

The nano-coating of the present invention imparts the hydrophobicity onto the glass substrate/surface with more than 50% reduction of coefficient of friction with respect to untreated glass substrate/surface and with a water contact angle of about or more than 90°. Unlike conventional coating method on glass substrate/surface, the present invention provides anti-scratching nano-coating on glass substrate/surface that is durable and hydrophobic nano-layer.

A second aspect of the present invention relates to a method for forming the nano-coating onto a glass substrate/surface from a sol-gel precursor solution comprising atomization of the sol-gel precursor solution such that the sol-gel precursors are turned from a liquid state into gaseous state under compressed air from 15 to 30° C. or at about room temperature via any available means such as an atomization nozzle. In particular, the sol-gel precursor solution includes one or more tetraalkoxysilanes and one or more polyfluorinated silanes, in which after hydrolysis reaction between the one or more tetralkoxysilanes and the one or more polyfluorinated silanes in the presence of a catalyst and a solvent, the nano-coating as-fabricated imparts hydrophobicity onto a glass substrate/surface. Before the atomization of the sol-gel precursor solution, the glass substrate/surface is treated with an acid-containing solution comprising at least one stronger acid and one weaker acid or an alkali-containing solution comprising at least one ammonia solution (e.g. 25-28 wt. %). The glass substrate/surface is pre-treated with the acid-containing or alkali-containing solution to have a hydrophilic property with a lower water contact angle than that of untreated glass surface and a lower surface roughness compared with the original surface roughness of the untreated glass surface/substrate. The resulting glass substrate/surface coated with the durable and anti-scratching nano-coating has about or more than 90° water contact angle.

DETAILED DESCRIPTION

Anti-scratching coating can be defined as a material applied onto a substrate surface to form film so as to provide protective purpose for the substrate. Generally, the thickness of the anti-scratching coating with multi-layered structure has an obvious negative effect on the appearance of the underlying substrate. Even for the transparent anti-scratching coating for glass, the visible light transparency of glass is reduced and glass appearance is affected due to the presence of micrometer thickness coating. Advancement of nanotechnologies in materials, substantial research has been conducted to develop new nano-coating materials where the customers always prefer to use the coating products with the initial appearance of underlying substrate retained and with additional functions. Therefore, the utilization of nano-coating can satisfy the requirement of high transparency at the same time with the presence of functional properties, thereby enhancing the overall performances, extending the service life, reducing energy consumption and protecting environment. Currently, nano-coating is generally created by ultra-film formation in which a new layer is deposited on top of a substrate by chemical vapor deposition or nano-spraying technology. The nano-coating can be formed on the substrate physically or chemically from a gas, liquid or solid state via sophisticated equipment. The entire production process is costly and the performances of nano-coating are limited by the morphology of nanolayer. As a result, it is very difficult to realize mass production and wide applications of those nano-coating materials. This invention thereby provides a sol-gel precursor solution derived from hydrolysis of one or more polyfluorinated silanes and one or more tetralkoxysilanes, and also provides a method of using this sol-gel precursor-containing composition to form an anti-scratching nanolayer on glass substrate/surface via atomization process. Before the application of the sol-gel precursor-containing composition on glass substrate/surface, the glass substrate/surface is treated with an acid-containing solution (or an alkali-containing solution) to remove the "valleys" of the glass substrate/surface, resulting in a smooth glass surface. Both the sol-gel precursor solution and the acid-containing solution (or an alkali-containing solution) can be applied to the glass substrate/surface via atomization process.

The present invention provides a method of producing an anti-scratching nano-coating with hydrophobicity on glass surface. The method comprises providing an active layer on glass surface after acid solution treatment and formulating sol-gel precursor solutions from one or more types of tetralkoxysilane and more or more types of polyfluorinated silanes that are able to process sol-gel hydrolysis in the solvent with the presence of a catalyst at room temperature. The acid-containing or alkali-containing solution and the sol-gel precursor solution can be applied by atomization deposition method in which the solution in liquid status can be transformed to be gas by compressed air machine and an atomization nozzle. The application process should be conducted in a sealed chamber called by atomization chamber in this invention. The anti-scratching nano-coating as-produced is durable from rubbing and UV irradiation and has at least 90° of water contact angle. The present hydrophobic surface of the nano-coating on glass significantly reduces the coefficient of friction of glass surface. The sol-gel precursor solution of the present invention exhibits strong adherence to glass surface by forming bonds with silanol group (Si—O—) on glass surface. The durable hydrophobic nano-coating is also capable of withstanding the rubbing and UV irradiation. In addition to forming a hydrophobic nano-coating on the glass surface, the sol-gel precursor solution of the present invention is capable of reducing the coefficient of friction to be lower than half of that of untreated glass surface.

The present invention also provides an acid-containing or alkali-containing solution for treating the glass surface. The acid-containing solution comprises at least one volatile acid and another stable acid. The alkali-containing solution includes at least one ammonia solution and other solvents such as hydrogen peroxide. Both acid containing and alkali-containing solutions can treat the surface to impart an active layer on the glass with hydrophilic property and the hydrophilic layer can fill in the valleys of glass surface so as to reduce the height of valleys of glass surface. The glass surface having been coated with the present acid solution has lower water contact angle than that of untreated glass surface and the roughness of the glass treated with acid-containing or alkali-containing solution has lower value. In one embodiment, the surface having been treated with the present acid solution has a water contact angle of 20° and the roughness of the acid-treated glass is 6.6 nm. The nano-coating according to an embodiment of the present invention has a roughness of about 100 nm or lower, preferably in the range of 30-50 nm. The nano-coating of the present invention is substantially transparent to visible light.

In one embodiment, synthesis of sol-gel precursor from tetralkoxysilane silane and polyfluorinated silane is performed in the presence of a solvent and a catalyst. The catalyst is less than 5 wt % of the reaction mixture. Below is a schematic representation of the tetralkoxysilane of the present invention:

The alkoxy group (—OR') of the tetralkoxysilane of the present invention may be any aliphatic or cycloaliphatic alkoxy group as appreciated by one skilled in the art. The tetralkoxysilane for forming sol-gel precursor solution of the present invention is tetraethyl orthosilicate, i.e., Formula (I), or tetramethyl orthosilicate, i.e., Formula (II), or a combination thereof as shown below:

The polyfluorinated silane can enable the glass surface to repel water and thereby imparts a hydrophobicity to the glass surface after the hydrolysis reaction of the polyfluorinated silane and tetraalkoxysilane which forms a sol-gel precursor solution in the presence of the solvent and catalyst. The fluorinates silane of the present invention is a kind of polyfluorinated compound having at least trialkoxysilane as showed below:

wherein OR' is selected from an aliphatic or cycloaliphatic alkoxy group.

Two examples of polyfluorinated silane are given in Formula (III) and Formula (IV):

In a preferred embodiment, the polyfluorinated silane of the present invention contains at least a trialkoxysilane and from 15 to 17 fluorine atoms.

In one embodiment, the weight ratio of tetralkoxysilane and polyfluorinated silane is between 1:3 to 3:1. The solvent is added to the mixture of the silanes to process the sol-gel reaction. Solvent may be used in the invention include, but are not limited to, methanol, ethanol, isopropanol or a combination thereof. The formed sol-gel precursor solution also can be diluted by solvent including, but being not limited to, methanol, ethanol, isopropanol tetrahydrofuran, dimethylformamide or a combination thereof. The present method of fabrication of the sol-gel precursor solution comprises adding a catalyst for initiating sol-gel reaction, where the catalyst can be the candidate(s) disclosed in the present invention or any catalyst readily known by one skilled in the art. The present invention provides an application route of the acid solution and the sol-gel precursor solution via atomization method.

Figure 1:
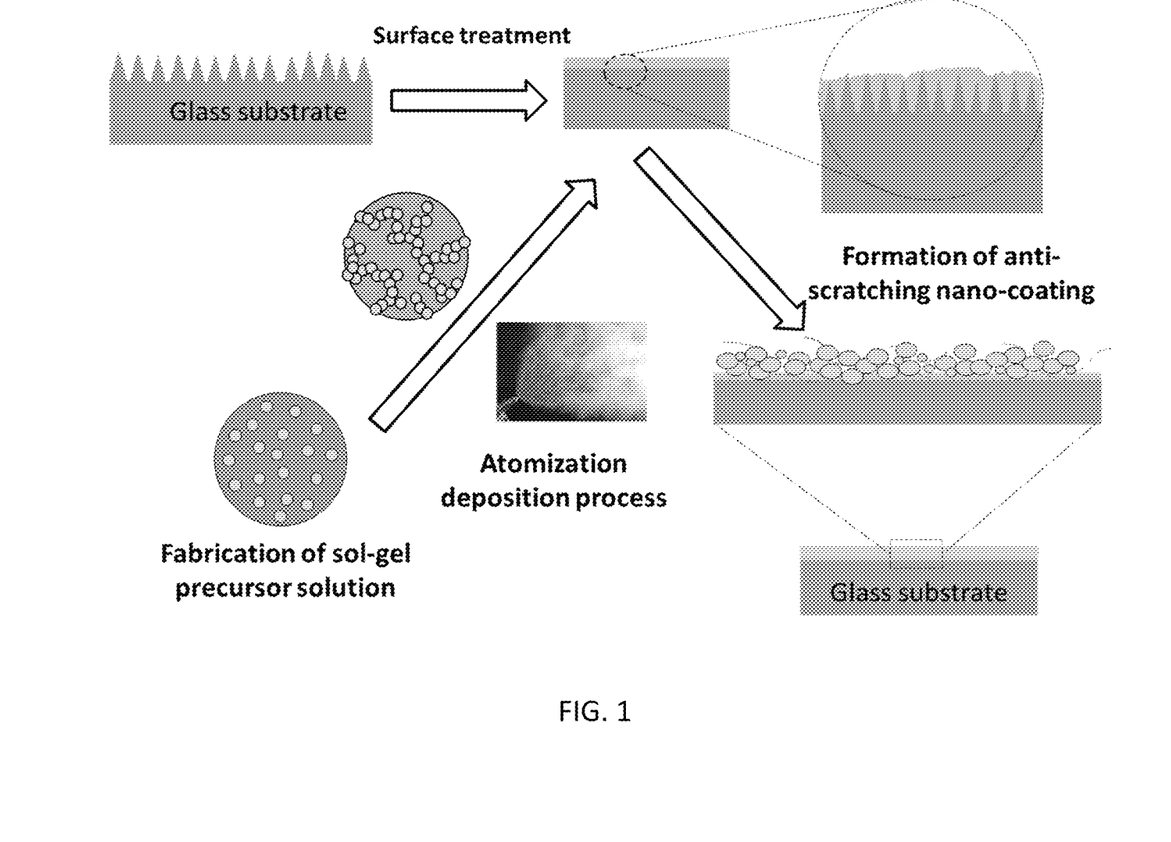
FIG. 1 schematically depicts a method of fabrication of the durable, anti-scratching nano-coating according to an embodiment of the present invention.

FIG. 1 is a schematic diagram illustrating the fabrication process utilizing atomization deposition techniques of the sol-gel precursor solution to form the durable, hydrophobic and anti-scratching nano-coating onto glass surface. Firstly, the surface of the glass is pre-treated by an atomized surface modifier, i.e., an acid-containing solution including one stronger and one weaker acids in order to impart hydrophilicity (lower water contact angle), and remove the "valleys", i.e., make the surface roughness smoother by etching, followed by an atomized sol-gel precursor from a sol-gel precursor solution comprising at least one tetralkoxysilane and at least one polyfluorinated silane. The fluorinated silica is formed from hydrolysis of the sol-gel precursor solution in the presence of a suitable catalyst and an organic solvent such as methanol. The fluorinated silica is atomized in the same chamber where the glass surface/substrate is pre-treated. The nano-coating of the present invention is formed thereafter.

Figure 2:
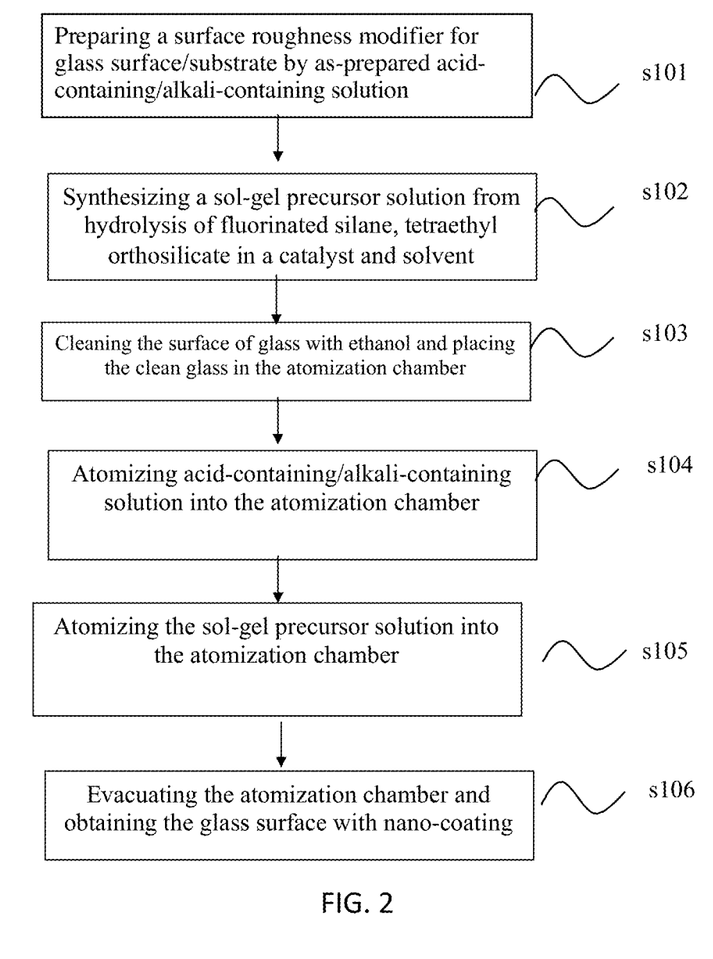
FIG. 2 is a flow chart summarizing the general steps of the fabrication method of the present nano-coating.

FIG. 2 summarizes the present method of fabricating the nano-coating onto a glass surface from atomized acid-containing solution (or an alkali-containing solution in some embodiments) followed by atomization of sol-gel precursor solution. The method includes, but not limited to, the following steps:

preparing an acid-containing for pre-treating the glass surface or substrate by mixing two acids including one stronger and one weaker acids (s101), or preparing an alkali-containing solution, in order to reduce water contact angle of the glass surface or substrate to 20° or lower, and reduce surface roughness;

synthesizing a sol-gel precursor solution (s102) comprising one or more tetraalkoxysilanes having at least three alkoxy groups, one or more polyfluorinated silanes having at least a trialkoxysilane and from 15 to 17 fluorine atoms, and a solvent, and the one or more tetraalkoxysilanes and the one or more polyfluorinated silanes being hydrolyzed in the presence of a catalyst and the solvent;

cleaning the glass surface or substrate and placing the clean glass in an atomization chamber (s103);

atomizing the acid-containing solution into the atomization chamber (s104) such that surface roughness and water contact angle of the glass surface or substrate are reduced;

atomizing the sol-gel precursor solution into the atomization chamber (s105) to form the nano-coating onto the glass surface or substrate such that water contact angle of the glass surface or substrate is increased to at least about 90° and coefficient of friction of the glass surface or substrate is reduced by at least 50%;

obtaining the glass surface or substrate coated with the nano-coating after evacuating the atomization chamber (s106).

EXAMPLES

The acid solution and sol-gel precursor solution are prepared in accordance with the present invention. The acid solution comprises a mixture of hydrochloric acid and phosphoric acid in a ratio of 3:2. The sol-gel precursor solution is formed as follows: A glass flask is filled with a polyfluorinated silane containing 15 to 17 fluorine atoms such as 1H, 1H, 2H, 2H-Perfluorodecyltrimethoxysilane (17FTS) (i.e., formula IV) which may include the compound of formula III, and tetraethyl orthosilicate (TEOS) in a ratio of 1:1, and methanol as a solvent. The mixture is stirred at the speed of 300 rpm for 10 min and added with 0.05 wt % catalyst (28% ammonia solution). The mixture is then stirred at the speed of 350 rpm for 30 min to form the sol-gel precursor solution.

Figure 3A:
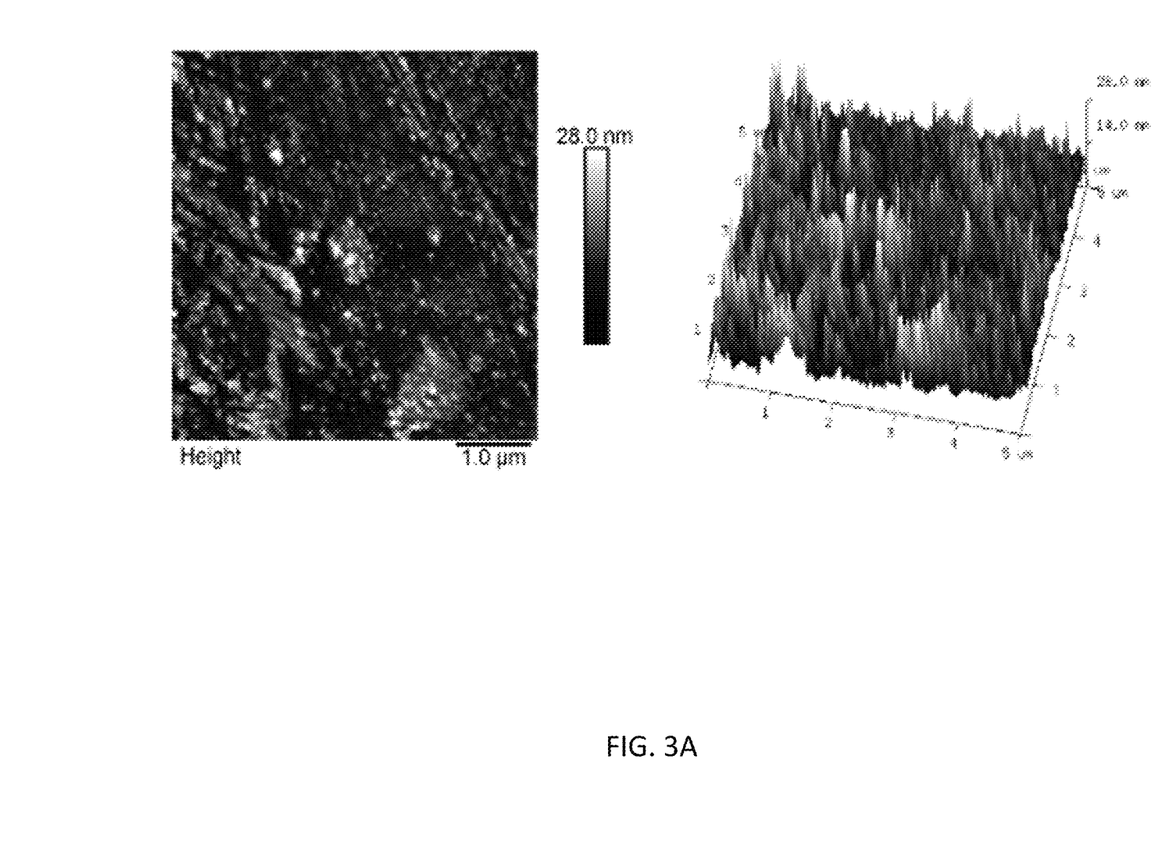
FIG. 3A shows Atomic Force Microscope (AFM) micrograph of an untreated glass surface.
Figure 3B:
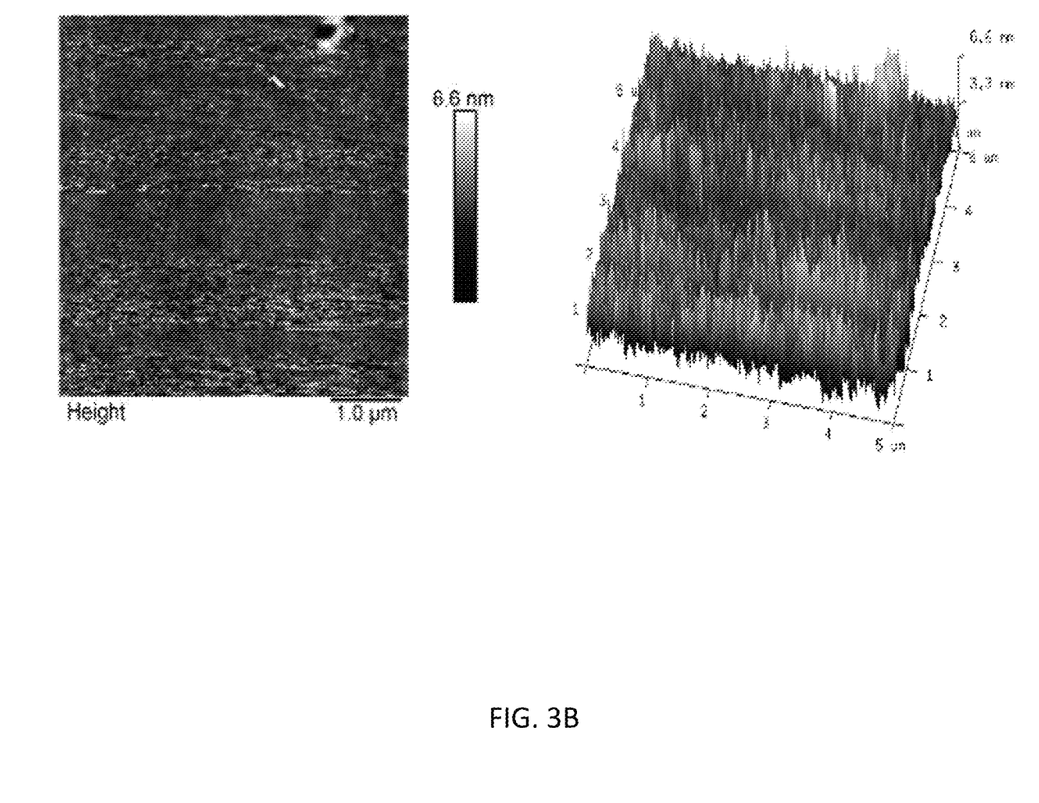
FIG. 3B shows Atomic Force Microscope (AFM) micrograph of a glass surface treated with the acid-containing solution of the present invention.
Figure 3C:
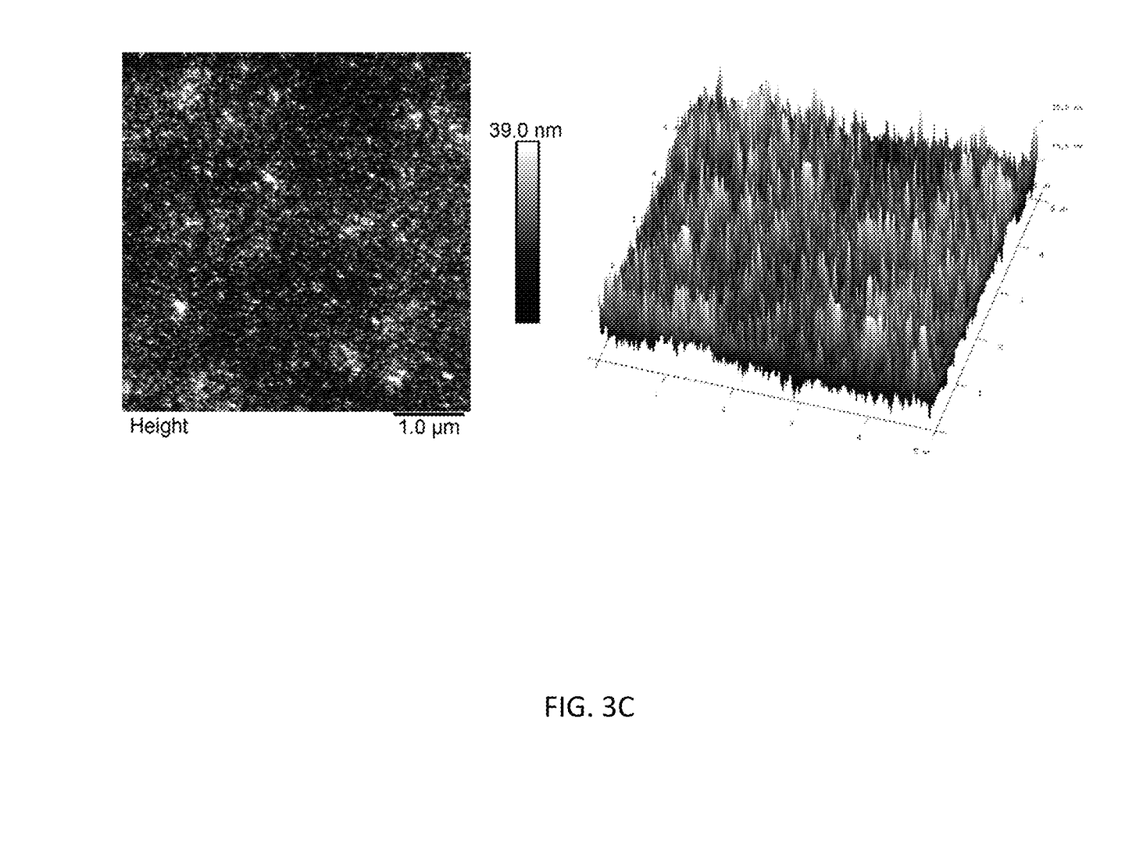
FIG. 3C shows Atomic Force Microscope (AFM) micrograph of a glass surface coated with the present nano-coating according to an embodiment of the present invention.

The acid solution and sol-gel precursor solution are applied on glass surface via atomization deposition method. It means that the solutions are vaporized using compressed air atomization. The acid solution is used to treat the surface of glass in order to remove the valleys of the glass. As shown in FIG. 3, the roughness of untreated glass surface is about 28 nm and it is reduced to be 6.6 nm after the acid treatment. The roughness of glass surface coated with the present nano-coating is increased to 38 nm due to the presence of the present nano-coating.

Figure 4A:
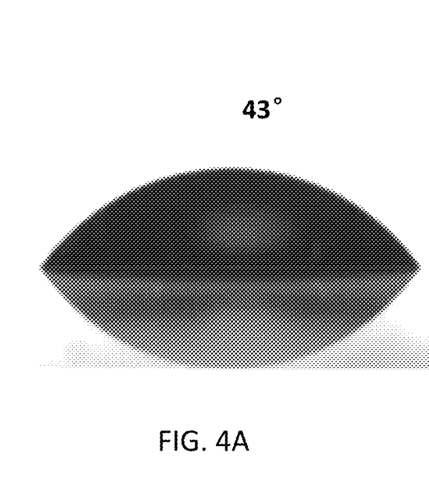
FIG. 4A shows a measurement of water contact angle of the untreated glass surface as in FIG. 3A.
Figure 4B:
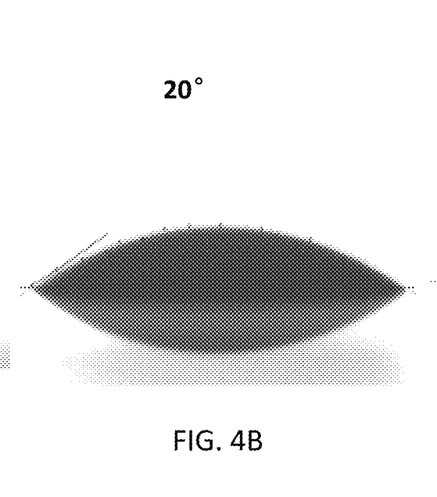
FIG. 4B shows a measurement of water contact angle of the treated glass surface with the acid-containing solution of the present invention as in FIG. 3B.
Figure 4C:
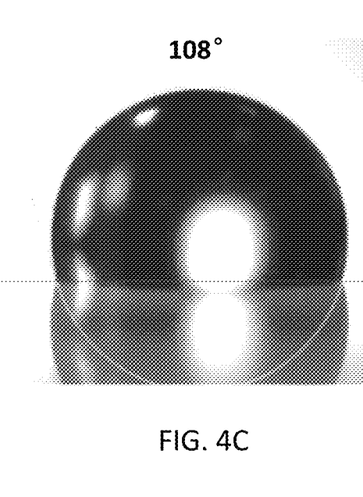
FIG. 4C shows a measurement of water contact angle of the treated glass surface coated with the present nano-coating according to the same embodiment as in FIG. 3C.

Water contact angle of the glass surface treated with acid and coated with the present nano-coating are measured and compared with untreated glass surface. The untreated glass surface has a water contact angle of about 43° (FIG. 4A). Obvious decrease in water contact angle is observed on glass surface treated with acid solution (FIG. 4B). Water contact angle greater than 90° is observed for glass surface coated with the present nano-coating, which is shown in FIG. 4C.

Figure 5A:
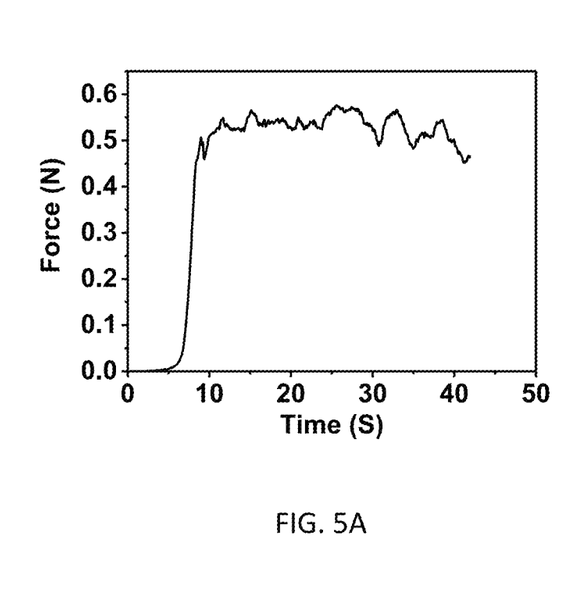
FIG. 5A shows a coefficient of friction measurement of an untreated glass surface in terms of force applied on the glass surface over time.
Figure 5B:
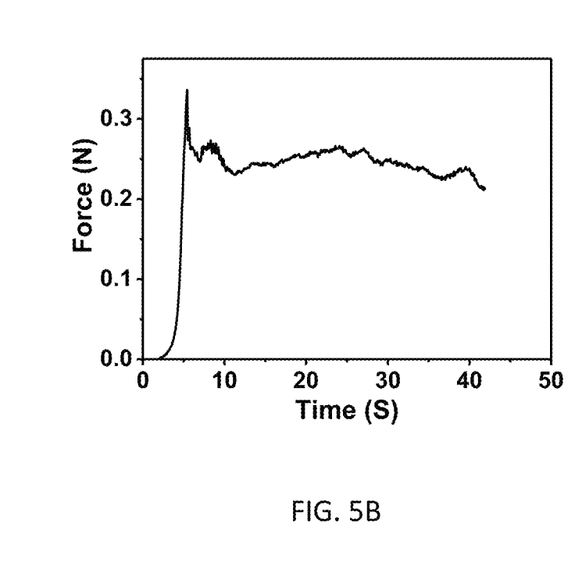
FIG. 5B shows a coefficient of friction measurement of a glass surface coated with the present nano-coating according to an embodiment of the present invention in terms of force applied on the glass surface over time.
Figure 6A:
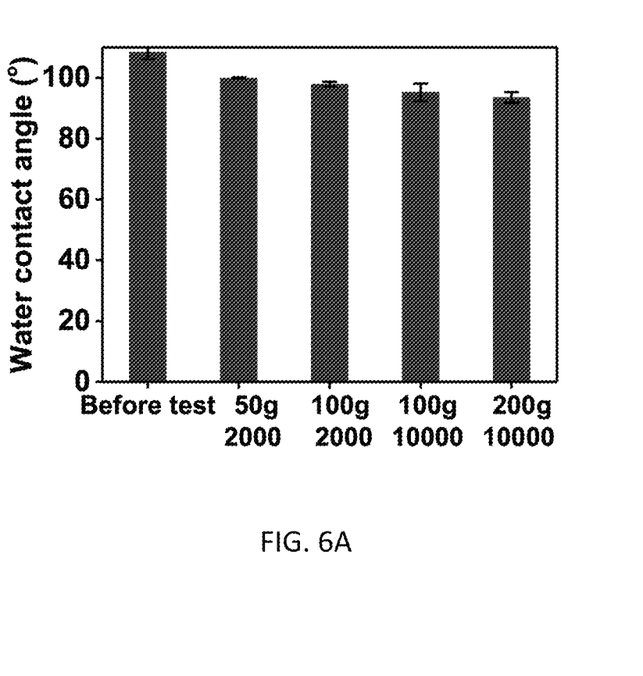
FIG. 6A shows the change in water contact angle of a glass surface coated with the present nano-coating according to an embodiment of the present invention before and after a rubbing test with different weight and/or cycles of rubbing applied onto the glass surface.
Figure 6B:
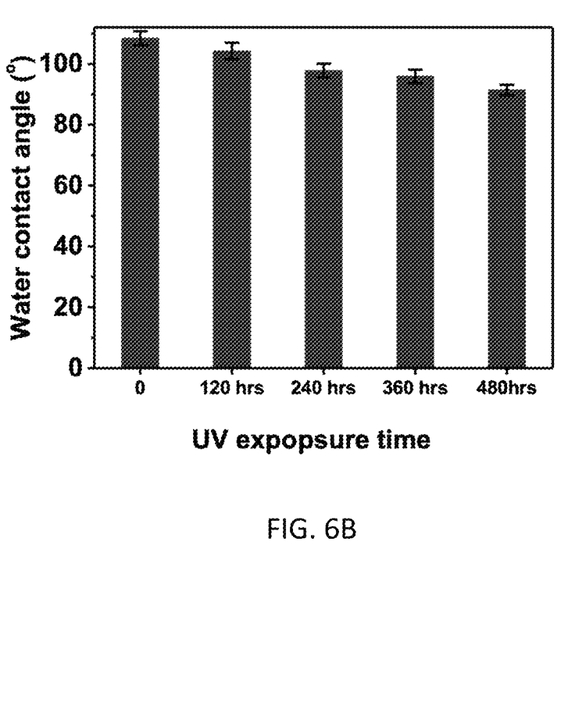
FIG. 6B shows the change in water contact angle of a glass surface coated with the present nano-coating according

The glass surface coated with the present nano-coating provides a lower coefficient of friction (~0.23) (FIG. 5B) than that of untreated glass surface (~0.51) (FIG. 5B). The present nano-coating for the glass surface is durable, and its hydrophobicity is demonstrated after rubbing test and accelerated weathering test. FIG. 6A shows that the results of water contact angle values of the glass coated with the present coating before and after the rubbing test under various loading and cycles including 50 g 2000 cycles, 100 g 2000 cycles, 100 g 10000 cycles, and 200 g 10000 cycles. It can be seen that all of the water contact angles of glass coated with the present nano-coating is more than 90°, which demonstrates that the present nano-coating is not easily removed after the rubbing testing. In FIG. 6B, the changes of water contact angle values of the glass coated with the present nano-coating are measured after UV exposure test with different time durations including 120 hours, 240 hours, 360 hours and 480 hours. It can be seen that the water contact angle of the glass coated with the present nano-coating is kept above 90°, which demonstrates that the present nano-coating is still hydrophobic after over 480 hours of UV exposure.

It should be apparent to those skilled in the art that many modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "includes", "including", "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A durable, hydrophobic and anti-scratching nano-coating on a glass substrate or surface having a water contact angle of about 90° or more, a reduced coefficient of friction by 50% or more compared to the coefficient of friction of the glass substrate or surface without said nano-coating, and a reduced surface roughness of at least four times compared to the glass substrate or surface without said nano-coating, comprising:
  a pretreated glass substrate or surface, the glass substrate or surface having been pretreated by an acid-containing solution comprising at least one stronger acid and one weaker acid and hydrogen peroxide;
  a layer of fluorinated silica derived from sol-gel hydrolysis between one or more tetraalkoxysilanes and one or more polyfluorinated silanes having at least a trialkoxysilane and from 15 to 17 fluorine atoms in the presence of a catalyst to a reaction mixture of the sol-gel hydrolysis between the one or more tetraalkoxysilanes and the one or more polyfluorinated silanes, and a solvent.

2. The nano-coating of claim 1, wherein the one or more tetraalkoxysilanes is/are represented by the following formula:

wherein OR' is selected from an aliphatic or cycloaliphatic alkoxy group.

3. The nano-coating of claim 1, wherein the one or more tetraalkoxysilanes is/are represented by the following formulae (I) and (II):

4. The nano-coating of claim 1, wherein the one or more polyfluorinated silanes is/are represented by the following formula:

wherein OR' is selected from an aliphatic or cycloaliphatic alkoxy group.

5. The nano-coating of claim 1, wherein the one or more polyfluorinated silanes is/are represented by the following formulae (III) and (IV):

6. The nano-coating of claim 1, wherein the one or more tetraalkoxysilanes and one or more polyfluorinated silanes are in weight ratio from 1:3 to 3:1.

7. The nano-coating of claim 1, wherein the stronger acid is selected from hydrochloric acid and the weaker acid is selected from phosphoric acid and the weight ratio of the stronger and weaker acids is from 2:1 to 1:2.

8. The nano-coating of claim 1, wherein the sol-gel hydrolysis is performed under compressed air and at a temperature from 15 to 30° C.

9. The nano-coating of claim 1, wherein the catalyst is less than 5 wt % of the sol-gel hydrolysis reaction mixture.

10. The nano-coating of claim 9, wherein the catalyst is ammonia solution.

11. The nano-coating of claim 1, wherein the solvent is methanol.

12. The nano-coating of claim 1, wherein the nano-coating has a thickness of about 100 nm or lower.

13. The nano-coating of claim 1, wherein the nano-coating is substantially transparent to visible light.

14. A method of fabricating the durable, hydrophobic and anti-scratching nano-coating on a glass or substrate or surface of claim 1, comprising:
    pretreating a glass substrate or surface with an acid-containing solution comprising at least one stronger acid and one weaker acid and hydrogen peroxide;
    synthesizing a sol-gel precursor solution comprising one or more tetraalkoxysilanes, one or more polyfluorinated silanes having at least a trialkoxysilane and from 15 to 17 fluorine atoms, and a solvent, and the one or more tetraalkoxysilanes and the one or more polyfluorinated silanes being hydrolyzed in the presence of a catalyst and the solvent;
    atomizing the acid-containing solution into an atomization chamber such that surface roughness and water contact angle of the glass surface or substrate are reduced;
    atomizing the sol-gel precursor solution into the atomization chamber to form the nano-coating onto the glass substrate such that water contact angle of the glass surface or substrate is increased to at least about 90° and coefficient of friction of the glass surface or substrate is reduced by at least 50%;
    obtaining the glass substrate coated with the nano-coating after evacuating the atomization chamber.

15. The method of claim 14, wherein said atomizing is performed at a temperature from 15 to 30° C.

16. The method of claim 14, wherein the one or more tetraalkoxysilanes and one or more polyfluorinated silanes are in weight ratio from 1:3 to 3:1.

17. The method of claim 14, wherein, said at least one stronger acid is selected from hydrochloric acid and said at least one weaker acid is selected from phosphoric acid, and the stronger and weaker acids have a weight ratio of 2:1 to 1:2.

18. The method of claim 14, wherein the one or more tetraalkoxysilanes is/are represented by the following formulae (I) and (II):

19. The method of claim 14, wherein the one or more polyfluorinated silanes is/are represented by the following formula:

wherein OR' is selected from an aliphatic or cycloaliphatic alkoxy group.

20. The method of claim 14, wherein the one or more polyfluorinated silanes is/are represented by the following formulae (III) and (IV):

21. The method of claim 14, wherein the catalyst is ammonia solution.

22. The method of claim 14, wherein the solvent is methanol.

* * * * *